United States Patent [19]

Vidal

[11] Patent Number: 5,504,167
[45] Date of Patent: Apr. 2, 1996

[54] PROCESS FOR THE PREPARATION OF POLYETHYLENE COPOLYMERS

[75] Inventor: Antonio Vidal, Wilmington, Del.

[73] Assignee: E. I. Du Pont de Nemours and Company, Wilmington, Del.

[21] Appl. No.: 314,176

[22] Filed: Sep. 28, 1994

[51] Int. Cl.$^6$ .............................. C08F 210/02; C08F 2/06
[52] U.S. Cl. .............................. 526/74; 526/193; 526/212; 526/219.6; 526/218.1; 526/227; 526/230; 526/230.5; 526/272; 526/318.25; 526/318.6; 526/320; 526/326; 526/329; 526/342
[58] Field of Search ................... 526/74, 193, 219.6, 526/218.1, 227, 230.5, 272, 318.25, 318.6, 320, 326, 329, 342, 212

[56] References Cited

U.S. PATENT DOCUMENTS

| | | | |
|---|---|---|---|
| 4,012,574 | 3/1977 | Jones et al. | 526/74 |
| 4,252,924 | 2/1981 | Chatterjee | 526/65 |
| 4,351,931 | 9/1982 | Armitage | 526/277 |
| 4,375,533 | 3/1983 | Park et al. | 526/193 |
| 4,692,502 | 9/1987 | Uebele et al. | 526/193 |
| 5,028,674 | 7/1991 | Hatch et al. | 526/216 |

*Primary Examiner*—Fred Teskin

[57] ABSTRACT

An improved process for the continuous copolymerization of ethylene with certain polar comohomers having reactive double bonds is disclosed wherein reactor fouling is significantly reduced or eliminated by use of surfactants.

12 Claims, No Drawings

PROCESS FOR THE PREPARATION OF POLYETHYLENE COPOLYMERS

FIELD OF THE INVENTION

This invention concerns a process for preparing polymers of limited solubility in supercritical fluids using selected surfactants to prevent reactor fouling. Specifically, this invention concerns a process comprising the use of surfactants in the high-pressure process for ethylene copolymers. The products herein are useful as packaging materials and in flexible automotive parts having good solvent and heat resistance.

TECHNICAL BACKGROUND

Continuous copolymerization of ethylene with other comonomers is well known in the art. Two types of reactors which are widely used for such polymerizations are tubular reactors and stirred tank reactors. These reactors are quite different in their dimensions, and hence in the environment and state of motion of the reacting mixture. The nature of the polymers made in these various reactors is described in U.S. Pat. No. 4,351,931 for ethylene-methacrylic acid copolymers, which is hereby incorporated by reference.

The high-pressure process used for making polyethylene generally operates at conditions of pressure and temperature at which the polymer is soluble in the supercritical ethylene phase in the polymerization reactor. This process can be used to make copolymers and terpolymers of ethylene with more reactive polar comonomers like acrylic and methacrylic acids, and their esters. These newer polymer compositions are less soluble than polyethylene in the supercritical monomer phase, which can cause the buildup of an insoluble polymer layer on the internal reactor surfaces, commonly referred to as reactor "fouling". Excessive fouling can lead to decreased mixing quality, reduced product quality, and process shutdowns.

Conventional approaches to reduce reactor fouling have focused on increasing the solubility of the polymer in the supercritical monomer phase by increasing reactor temperature and pressure, and by the addition of polar solvents like acetone and methanol to increase the solubility of the polar comonomers in the supercritical ethylene phase. There are, however, serious limitations to these approaches. Increasing pressure beyond the design limits of the original polyethylene reactors and monomer compressors requires their replacement with expensive new equipment designed for the higher pressure. Increasing temperature promotes unwanted side reactions that limit attainable molecular weight and reduce product quality, for example color and strength. Addition of solvents also limits molecular weight, and requires additional investment and cost for solvent storage, feed, removal and disposal.

Another problem encountered in trying to control polymer solubilty in supercritical fluids is the high sensitivity of the solvent to relatively small changes in temperature or pressure. Slight changes in temperature and/or pressure can lead, in some cases, to sudden separating out of a now-insoluble copolymer, thus leading to potentially rapid reactor fouling.

For the production of random uniform copolymers in a continuous stirred tank reactor, it is desirable to keep the polymerizing mixture in one phase. Increasing the temperature and/or pressure for any monomer mix will decrease the likelihood of separating the mix into two phases. However, when the copolymerization is carried out in internally stirred reactors, the highly polar comonomers result in build up of polymer deposits on the inner surfaces of the reactor far more readily than with non-polar monomers, and at temperatures and pressures at which little or no deposits would occur with non-polar monomers. These deposits may be related to localized phase separation in localized colder regions of the polymerization kettle, such as the monomer inlet region or stirrer seal region.

The formation of these deposits adversely affects the stable operation of the reactor. In addition, with the passage of time, the deposits thermally crosslink to form an intractable gel. As gel particles subsequently are released from the reactor surfaces by the combined action of the shear of the stirrer and the flow of monomers through the vessel, the presence of those crosslinked particles in the copolymer tends to compromise the quality of the copolymer produced.

Comonomers with reactivities substantially equivalent to ethylene, such as vinyl acetate, normally will not exhibit this effect. In these cases, the relative proportion of each monomer incorporated into the polymer is similar to that of the monomer mix. In a continuous reactor operating under steady conditions, this means the composition of the monomer mix will be similar to that of monomers polymerized into the polymer. The polarity of the polymer will tend to be similar to that of the monomer mix, which substantially reduces the likelihood of reactor fouling.

U.S. Pat. No. 4,351,931 discloses high molecular weight uniformly random copolymers of ethylene and acrylic or methacrylic acid containing up to 10% of the acid together with a process for preparing such copolymers.

U.S. Pat. No. 4,252,924 discloses similar copolymers of ethylene and acrylic or methacrylic acid containing up to 35% of the acid component together with a process for preparing these copolymers.

U.S. Pat. No. 5,028,674, hereby incorporated by reference, discloses an improved process for the continuous polymerization of ethylene with certain polar comonomers, including $\alpha,\beta$-unsaturated carboxylic acids, wherein the addition of methanol, reduces or eliminates reactor fouling.

Various methods have been proposed to solve the problem of reactor fouling, including periodic reactor scraping or the addition of cosolvent methanol as in U.S. Pat. No. 5,028,674. However, none of these methods provides a completely satisfactory method of reducing reactor fouling, especially in the cases where the comonomers have significantly different rates of reaction from that of ethylene.

There is a need for a process for the copolymerization of ethylene with highly reactive comonomers in which a single phase is maintained in the reactor and with decreased separation or deposition on the inner parts of reactor vessel.

SUMMARY OF THE INVENTION

This invention provides an improved process for the continuous copolymerization of ethylene with $\alpha,\beta$-unsaturated carboxylic acids and their esters which improvement consists of the use of 100 to 5000 parts per million, preferably 500–1000 parts per million, of selected fluorocarbon and phosphate ester surfactants.

The present invention provides, in a process for the continuous copolymerization of ethylene with at least about 2 weight percent of at least one comonomer selected from the group consisting of (a) alpha-beta unsaturated carboxylic acids having 3 to 8 carbon atoms, (b) esters and glycidyl esters of the above (a) acids with $C_1$ to $C_8$ alcohols and with phenols and naphthols having up to 2 alkyl substituents of 1–4 carbon atoms, and (c) anhydrides and nitrilo derivatives of the above (a) acids, and the resulting copolymer contains about 15–98 weight percent of copolymerized ethylene, wherein the monomers and a free-radical initiator are continuously introduced into a stirred copolymerization reactor maintained at a temperature of about from 120° C. to 300° C. at a rate such that the residence time of the material flowing through the reactor is about 10 seconds to 5 minutes, and optionally introducing into the copolymerization reactor a solvent consisting essentially of methanol in an amount of about 2–25 weight percent of the total material flowing through the reactor and recovering the copolymer from the reactor effluent, wherein the improvement comprises concurrently introducing into the reactor 100 to 5000 parts per million by weight, based on the total material flowing through the reactor, of selected fluorocarbon and phosphate ester surfactants. Examples of surfactants include Zonyl® FSO 100 fluorosurfactant, Zelec® UN and Actrafos® SA 216.

DETAILED DESCRIPTION OF THE INVENTION

The invention of the present application concerns the addition of small amounts (100 ppm to 5000 ppm) of certain fluorocarbon and phosphate ester surfactants for elimination of reactor fouling during the synthesis of certain ethylene copolymers, for example the terpolymer comprising 41% ethylene, 55% methyl acrylate, and 4% maleic acid monoethyl ester (which corresponds to the commercially available —DuPont — "VAMAC" terpolymer).at conditions where this polymer cannot be made without severe reactor fouling in the absence of the surfactants.

It is believed that these surfactants work by preventing the coalescence and buildup of insoluble polymer on the internal surfaces of the reactor, and not by increasing polymer solubility.

This technique can be used with other ethylene copolymers that have limited solubility in the supercritical monomer phase in the reactor, such as copolymers of ethylene with acrylic and methacrylic acid, and to polymerization processes that are carried out in other supercritical fluids, for example $CO_2$.

The surfactants operable in the process of the present invention are characterized by having a non-polar portion such as an alkyl or fluoroalkyl group and a polar portion such as an ester or an ether group, and include, for example, Zonyl® FSO 100 fluorosurfactant, Zelec® UN and Actrafos® SA 216. Other suitable surfactants are other alkyl phosphate ester surfactants and fluorosurfactants that are soluble in the fluid in the polymerization reactor.

In the process of the present invention ethylene is copolymerized with at least one comonomer. As used herein, the term "copolymerization" means reaction with one or more comonomers to give dipolymers, terpolymers and the like. The process of the present invention is particularly applicable to the preparation of copolymers containing 30–95 weight percent of ethylene.

Comonomers with which the ethylene is copolymerized are selected from the group consisting of (a) alpha-beta unsaturated carboxylic acids having 3 to 8 carbon atoms, (b) esters and glycidyl esters of the above (a)1 acids with $C_1$–$C_8$ alcohols and with phenols and naphthols having up to 2 alkyl substituents of 1–4 carbon atoms, and (c) anhydrides of the above (a) acids.

Examples of these comonomers are alpha-beta unsaturated carboxylic acids having 3–8 carbon atoms, such as methacrylic acid, acrylic acid, maleic acid, fumaric acid and itaconic acid; esters and glycidyl esters of the above acids with $C_1$–$C_8$ alcohols and with phenols and naphthols having up to 2 alkyl substituents of 1–4 carbon atoms, such as methyl acrylate, ethyl acrylate, methyl methacrylate, ethyl methacrylate, butyl acrylate, isobutyl acrylate, pentyl acrylate, hexyl acrylate, 2-ethylhexyl acrylate, 2-ethylhexyl methacrylate, glycidyl methacrylate, phenyl acrylate, 4-methylphenyl acrylate, naphthyl acrylate, methyl hydrogen maleate, ethyl hydrogen maleate, and ethyl hydrogen itaconate; and anhydrides of the above acids, such as maleic anhydride and nitrilo derivatives of the above acids such as acrylonitrile, and methacrylonitrile.

Preferred ethylene copolymers that can be prepared by this process include, for example, ethylene/methacrylic acid, ethylene/acrylic acid, ethylene/methyl methacrylate, ethylene/isobutyl acrylate, ethylene/methyl methacrylate/methacrylic acid, ethylene/butyl acrylate/glycidyl methacrylate, and ethylene/methyl acrylate/ethyl hydrogen maleate copolymers.

The monomers to be copolymerized are typically introduced into the copolymerization reactor with at least one free-radical copolymerization initiator, according to known copolymerization techniques. Typical copolymerization initiators which can be used include, but are not limited to, peroxygen compounds ,such as lauryl peroxide, tert-butyl peracetate, tert-butyl peroxypivalate, di-tert-butyl peroxide, di(sec-butyl) peroxydicarbonate, as well as tert-butyl peroctoate. Other free radical initiators which can be used include azobis compounds such as, e.g. azobisisobutyronitrile. The choice of initiator will depend on the copolymerization temperature since each initiator has its own decomposition temperature, at which it efficiently generates free radicals. In general, the initiator is present in an amount of about from 0.0001 to 0.1 moles per 1000 pounds of polymer products. Suitable initiators for the copolymerization are described in "Effectiveness of Organic Peroxide Initiators in the High-Pressure Polymerization of Ethylene" by G. Luft and H. Bitsch, J. Macromol. Sci.-Chem., All, pp. 1089–1112 (1977).

The copolymerization temperature of the above reaction is generally maintained at about 120° C. to 300° C., and preferably about 140° C. to 260° C. The pressure is generally maintained at about 130 to 310 MPa, and preferably within the range of about 165 to 200 MPa.

The process of the present invention uses a methanol solvent, as in the process described by U.S. Pat. No. 5,028, 674. The methanol is present in an amount equal to about 2–25 percent by weight of the total material flowing through the reactor. Above about 25 weight percent, the monomer fraction of the reactor content can become diluted to the point that both the copolymerization rate and the molecular weight of the resulting copolymer would be adversely affected. Below about 2%, the methanol solvent may not be effective. Preferably, at least about 5 weight percent of the methanol is present to provide improved anti-fouling characteristics, and, in general, an amount equal to about 5–20 weight percent of the total material flowing through the reactor is preferred. While other solvent components can be present in the present process, they should not be of a character or present in an amount which substantially depreciates the basic performance of the methanol in its role in reducing fouling in the reaction.

The methanol solvent used in the present process can be used alone or in combination with other solvents, which may also function as chain transfer agents. Methanol is itself telogenic, and can reduce molecular weight significantly. In other cases, depending on the particular monomer and its amount, it may be desirable to add one or more conventional hydrocarbon chain transfer agents such as propane to adjust the molecular weight to the specific end use for which the copolymer is intended. Chain regulators or telogens often used in copolymerizations with polar monomers include small quantities of cyclohexane or other hydrocarbons such as propane.

Other solvents used in this type of polymerization can be used in combination with methanol in the instant process without detracting from the non-fouling benefits of the methanol or of the added surfactant. Such additional solvents include benzene and t-butanol, both of which are substantially non-telogenic. That is, they do not reduce or 'regulate' the molecular weight of the polymer.

The copolymerization is run as a continuous process in which ethylene, the reactive comonomer(s), and the solvent system and the surfactant, are continuously fed, together with initiator, into a stirred reactor, for example, an autoclave of the type disclosed in Christl et al., U.S. Pat. No. 2,897,183, hereby incorporated by reference. The rate of addition will depend on variables such as the polymerization temperature, pressure, monomers employed, and concentration of the monomers in the reaction mixture. The reaction mixture is continuously removed from the autoclave, and, after the reaction mixture leaves the reaction vessel, the resulting copolymer is separated from the volatile unchanged monomers and solvents by conventional means, e.g., by vaporizing the unpolymerized materials and solvents under reduced pressure and at an elevated temperature.

The process of this invention is operated so that a single phase is present in the copolymerization reactor substantially throughout the reactor. Accordingly, the amounts of comonomers and of solvent are adjusted to the type of comonomer or comonomers as well as to the operating conditions such as temperature, pressure, and rate of flow. Generally, the solvent permits the monomers and the copolymer to remain in the same phase in the reactor. The miscibility of those system components depends largely on their polarities and also on the amount of the polar comonomers relative to the amount of ethylene. Thus, for a higher concentration of polar comonomer or for a more polar comonomer, a larger amount of cosolvent may be required.

When the amount of comonomer in the ethylene copolymer is less than about 10%, especially when it is less than about 5%, the difference in polarity of the copolymer and the unchanged monomers is minimized, so that phasing out of the polymer is negligible. Addition of a surfactant to the process, as in the present invention, is most useful in a case where the amount of comonomer is at least about 20% of the copolymer.

Temperature, pressure and conversion affect the tendency to form a second phase. For example, increasing temperature and pressure help reduce fouling, but increasing temperature increases chain transfer and hence reduces molecular weight. By use of solvents, together with surfactants according the present invention, reactor fouling can be substantially reduced or prevented with even the most polar and reactive monomers.

Copolymers resulting from the the process of the present invention can be characterized by a broad spectrum of molecular weight that can be used for various purposes. Those having a low molecular weight, or high melt index, of greater than about 100, can be used as adhesives. In applications for which a higher molecular weight is desired, such copolymers can be modified by a variety of known techniques. For example, acid copolymers, such as ethylene (meth)acrylic acid can be neutralized to form ionomers as discussed in Rees, U.S. Pat. No. 3,264,272, hereby incorporated by reference. Those copolymers not amenable to ionomerization can be lightly branched or crosslinked by known techniques to increase molecular weight to a desired level.

Copolymers having a high molecular weight can be further treated, if desired, to reduce molecular weight by the addition of telogens, as will be evident to those skilled in the art.

The present invention is further illustrated by the following examples, in which parts, proportions, and percentages other than yields or conversions are by weight unless otherwise indicated.

EXAMPLES

GENERAL PROCEDURE

A 535 ml steel continuous stirred reactor was repeatedly flushed with essentially dry gaseous ethylene of greater than 99.9% purity to remove residual oxygen from the system. The reactor body temperature was then raised to the goal temperature, about 165° C., using external heaters.

Methanol containing 1% to 10% surfactant was continuously pumped at a rate of 0.772 kg/hr through the stirrer seal and into the reactor.

Ethylene, compressed to approximately 27,000 psi, 186 MPa (1837 atm) and then cooled to 25° C., was continuously metered to the reactor at a rate of 30 lb/hr. The flow of ethylene was used to establish the reactor pressure at about 36 MPa (1837 atm).

The cool ethylene and solvent feeds lowered the temperature of the reactor contents below the desired temperature of 165° C.

An initiator solution consisting of about 6% di-sec-butyl peroxydicarbonate in a non-polar solvent, odorless mineral spirits, was maintained in a separate reservoir and pumped to the reactor at a temperature of about 25° C. Once polymerization was initiated, as evidenced by an increase in the internal reactor temperature, a solution consisting of 2,015 kg/hr methyl acrylate, 0.096 kg/hr maleic acid monoethyl ester and 0.772 kg/hr methanol at a temperature of 25° C. was pumped into the reactor. The polymer produced contained 55 wt methyl acrylate, 4% maleic acid monoethyl ester and 41% ethylene.

The total concentration of polar solvent (methanol) in the reactor was 5% by weight, the flow of the initiator was increased to raise the reactor internal temperature to 165° C. The reactor internal temperature was maintained by adjusting the initiator solution flow. Polymerization continued and steady state operation was obtained after about 3 hours. The system was maintained at steady state operation for 12 hours. At the end of that period the reaction was terminated, the reactor disassembled and examined for fouling by polymer deposits.

Overall conversion of monomers to polymer was about 13%. The copolymer, unchanged monomers, solvent, and impurities were continuously removed from the reactor. The copolymer was separated from the gaseous components by reducing the exit stream pressure from about 186 MPa to atmospheric pressure across a high pressure valve. The off-gas contained ethylene and comonomers along with methanol as well as trace amounts of initiator and other normal impurities. The copolymer, containing small amounts of unchanged monomer, solvent, and other normal impurities, was collected and allowed to cool.

Tests were made with three surfactants: ZONYL® FSO 100 is a non-ionic fluorosurfactant sold by E.I. DuPont de Nemours and Company (hereinafter DuPont), Wilmington, De., 19898. ZELEC® UN, sold by DuPont, and ACTRAFOS® SA 216, sold by Climax Performance Materials Corporation, Summit, Illinois, 60501, are anionic phosphate ester surfactants.

EXAMPLE 1

ZONYL® FSO 100 was added as a solution in methanol at 0.5 wt % of the reactor feed. Methanol concentration in the feed was 5 wt %. No additional telogen was used. The average melt index of the product was 10. This surfactant is a viscous dark-brown liquid. The terpolymer product ranged in color from light brown to dark yellow. At the end of the run, the agitator was found to be completely free of polymer. A very small amount of polymer was found on the thermowells and on the walls of the reactor cavity. A ⅛"-thick layer of polymer was found on the reactor head; however, this layer peeled off very easily, as opposed to fouling from non-surfactant runs which is firmly attached to the metal surfaces. Based on fluorine analysis of the polymer by ion chromatography (IC), the concentration of ZONYL® FSO 100 in the product was 4.9 wt %.

EXAMPLE 2

ZELEC® UN was added as a solution in methanol at 500 parts per million (ppm) of the reactor feed. No additional telogen was used. The average product melt index was 6. This surfactant is a clear liquid. The terpolymer produced during this run had initially a light yellow color which was attributed to contamination with product from the previous made with ZONYL® FSO 100. The product was essentially clear and colorless by the end of the run. This run was terminated after only 9 hours of operation at goal conditions due to loss of ethylene feed. The agitator, thermowells and reactor cavity were almost completely free of polymer. Some polymer was found on the reactor head but it peeled off very easily. Based on phosphorous analysis of the polymer by IC, the concentration of ZELEC® UN in the product was 0.29 wt %.

EXAMPLE 3

ACTRAFOS® SA 216 was added in methanol solution at a concentration of 500 ppm surfactant and 5 wt % methanol in the reactor feed. No additional telogen was used. The average product melt index was 6. This surfactant is a viscous brown liquid. The product terpolymer was clear with a light yellow tint only noticeable in thick sections. ACTRAFOS® SA 216 was very similar in performance to ZELEC® UN. Internal reactor surfaces were essentially free of polymer at the end of the run, except for the head which had a ½ inch-thick layer of polymer on it, but this peeled off very easily. Based on phosphorous analysis by IC, the concentration of surfactant in the product was calculated to be 0.34%.

EXAMPLE 4

ZELEC® UN was added in methanol solution at a concentration of 500 ppm surfactant and 2 wt. % methanol in the reactor feed. Propane as added telogen was fed at 0.8 lb/hr to control melt index to an average of 5. The product terpolymer was colorless. At the end of the run, there was a light polymer coating on most of the surface of the agitator, thermowells and reactor cavity. Some parts of the agitator and thermowells were completely free of polymer. There was a thick layer of polymer on the reactor head, but it peeled off easily. Based on phosphorous analysis by IC, the surfactant concentration in the product was 0.29%.

What is claimed is:

1. In a process for the continuous copolymerization of ethylene with at least about 2 weight percent of at least one comonomer selected from the group consisting of:

(a) alpha-beta unsaturated carboxylic acids having 3 to 8 carbon atoms, (b) esters and glycidyl esters of the above (a) acids with $C_1$ to $C_8$ alcohols and with phenols and naphthols having up to 2 alkyl substituents of 1–4 carbon atoms, and (c) anhydrides and nitrilo derivatives of the above (a) acids, and the resulting copolymer contains about 15–98 weight percent of copolymerized ethylene, wherein:

the monomers and a free-radical initiator are continuously introduced into a stirred copolymerization reactor maintained at a temperature of about from 120° C. to 300° C. at a rate such that the residence time of the material flowing through the reactor is about 10 seconds to 5 minutes;

concurrently introducing into the copolymerization reactor a solvent consisting essentially of methanol in an amount of about 2–25 weight percent of the total material flowing through the reactor and recovering the copolymer from the reactor effluent;

the improvement comprising concurrently introducing 100 to 5000 parts per million by weight based on the total material flowing through the reactor of selected fluorocarbon and phosphate ester surfactants.

2. The process of claim 1 wherein the alpha-beta unsaturated carboxylic acids having 3–8 carbon atoms is selected from the group consisting of methacrylic acid, acrylic acid, maleic acid, fumaric acid and itaconic acid.

3. The process of claim 1 wherein the esters and glycidyl esters are selected from the group consisting of methyl acrylate, ethyl acrylate, methyl methacrylate, ethyl methacrylate, butyl acrylate, isobutyl acrylate, pentyl acrylate, hexyl acrylate, 2-ethylhexyl acrylate, 2-ethylhexyl methacrylate, glycidyl methacrylate, phenyl acrylate, 4-methylphenyl acrylate, naphthyl acrylate, methyl hydrogen maleate, ethyl hydrogen maleate, and ethyl hydrogen itaconate.

4. The process of claim 1 wherein the anhydride is maleic anhydride.

5. The process of claim 1 wherein the nitrilo derivative is selected from the group consisting of acrylonitrile, and methacrylonitrile.

6. The process of claim 1 wherein the free radical initiator is selected from the group consisting of peroxygen compounds and azobis compounds.

7. The process of claim 6 wherein the initiator is selected from the group consisting of lauryl peroxide, tert-butyl peracetate, tert-butyl peroxy-pivalate, di-tert-butyl peroxide, di(sec-butyl) peroxydicarbonate, tert-butyl peroctoate and azobisisobutyronitrile.

8. The process of claim 6 wherein the free-radical initiator is present in an amount between about 0.0001 to 0.1 moles per 1000 pounds of polymer products.

9. The process of claim 1 wherein the temperature of the process is maintained at 140° C. to 260° C.

10. The process of claim 1 conducted at about 130 MPa to about 310 MPa.

11. The process of claim 1 having a second solvent, in addition to the methanol solvent.

12. The process of claim 4 wherein the second solvent is selected from the group consisting of benzene and t-butanol.

* * * * *